United States Patent
Miller

[11] 3,881,596
[45] May 6, 1975

[54] PARTS FEEDER

[75] Inventor: Paul Marcus Miller, Seminole, Fla.

[73] Assignee: Tangen Drives, Inc., Clearwater, Fla.

[22] Filed: Oct. 15, 1973

[21] Appl. No.: 406,264

[52] U.S. Cl. .......... 198/276; 198/289; 198/220 BC; 221/160
[51] Int. Cl. ............................................ B65g 47/24
[58] Field of Search ....... 198/33 AA, 33 R, 220 BC, 198/255, 273, 276, 281, 288, 289; 221/159, 160

[56] References Cited
UNITED STATES PATENTS

| | | | |
|---|---|---|---|
| 1,191,938 | 7/1916 | Bazzoni | 221/160 |
| 1,897,116 | 2/1933 | Friedman | 221/159 |
| 2,661,833 | 12/1953 | Spurlin | 198/220 BC |
| 2,715,978 | 8/1955 | Sterling | 221/160 |
| 3,065,841 | 11/1962 | Stover | 221/160 |
| 3,150,762 | 9/1964 | Tricinci | 198/33 AA |
| 3,183,703 | 5/1965 | Fischer, Jr. | 198/33 AA |
| 3,392,816 | 7/1968 | Cox | 198/33 AA |
| 3,414,112 | 12/1968 | Ravn | 198/33 AA |
| 3,726,385 | 4/1973 | Sterling | 198/33 AA |
| 3,735,859 | 5/1973 | Miller | 221/160 |

*Primary Examiner*—Evon C. Blunk
*Assistant Examiner*—Richard K. Thomson
*Attorney, Agent, or Firm*—Dominik, Knechtel, Godula & Demeur

[57] ABSTRACT

A parts feeder is disclosed for delivering parts to the periphery of the unit being partially oriented, and requiring a secondary or even tertiary orientation in which the delivery track is curved substantially 180° and elevated in order to pass over the top of the feeder for additional orienting steps so that rejected parts will drop back into the feeder and substantially a straight length of a full diameter of the feeder may be employed for secondary and further orienting steps. In the present embodiment a rotary cone type feeder is disclosed, and the first orienting delivery is accomplished at the periphery, and a roller type diverter delivers parts into the delivery track. A brush is optionally employed to provide a positive drive to the parts as they proceed upwardly in the delivery track and to the secondary orientor. A discharge track is provided at the far end of the secondary orientor for discharging the oriented parts to be further processed. The method contemplates essentially the steps of feeding partially oriented parts upwardly and reversibly over a recirculating type feeder so that additional orienting steps may be conducted over the feeder and rejects recirculated.

9 Claims, 10 Drawing Figures

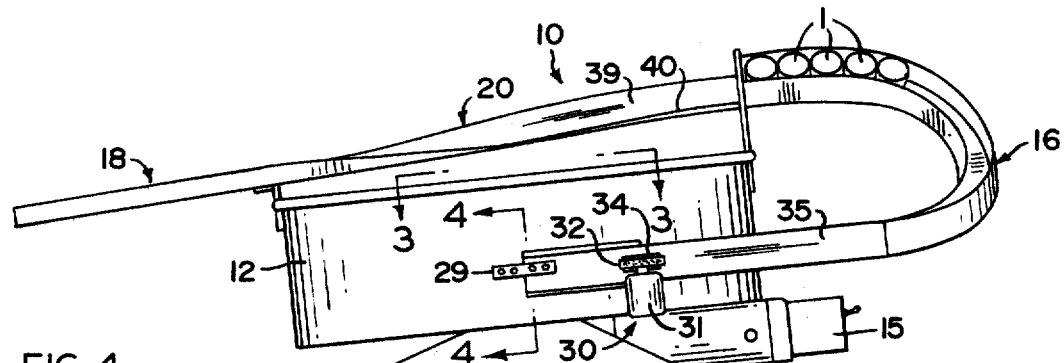

PARTS FEEDER

BACKGROUND OF THE INVENTION

1. Field of Invention

The present invention relates to the feeding of parts, and more particularly feeding parts by a centrifugal feeder such as exemplified in U.S. Pat. No. 3,735,859 but may also be employed with vibratory type feeders such as exemplified in U.S. Pat. Nos. 2,827,158 and 3,313,410. With both of the above exemplary feeders, orientation takes place internally of the feeder, and thereafter on a track that is a discharge track from the feeder. There is no provision in either of these examples for recirculating parts once they have left the feeder, and hence positive orientation must be provided along the track, or, alternatively all of the orientation must be performed on a sector or segment of the feeder interior.

2. Description of Prior Art

As indicated above, the art can best be described by the aforesaid U.S. Pat. Nos. 3,735,859 and 3,313,410. Invariably they employ plows, escapements, negative tracks, pneumatics, rotary wheels, and the like to accomplish orientation interiorily of the feeder. After the part leaves the feeder, whatever orientation is performed, it presupposes that positive orientation will be made and there can be no recirculation.

SUMMARY

The present invention is directed to apparatus and method for feeding parts in which the feeder, whether vibratory or rotor, whether circular or square or other shape, can perform partial orientation quickly and at high speed rates, with secondary orientation being performed after the parts have been shipped outside the feeder, and then returned substantially 180° after being elevated to a position over the top of the feeder so that further orientation may take place with the option of rejecting and recirculating unoriented parts. In the embodiment disclosed, a rotary cone-type feeder is employed, and is optionally provided with a roller type diverter at the delivery track, and powered optionally by a brush to elevate the parts with positive pressure in random orientation. In this instance the orientation is of a cup, and in one direction or another. A more specific aspect of the invention looks to the passing over substantially a diameter or major cross-sectional dimension of the feeder while the parts selected are transported downwardly to a discharge track, and those not oriented are tripped off and dumped into the feeder for reorientation and recirculation. The method presupposes the steps of delivering parts in a partially oriented fashion from a feeder, transporting the parts exterior of the feeder to an elevated and reversed position, and then permitting the parts to further be oriented as they pass in confined manner over the feeder to the end that those discharged will be recirculated.

It is therefore one of the principal objects of the present invention to provide a recirculatory type feed in which steps of orientation are achieved in a position over the recirculatory feeder after partial orientation has taken place interiorly of the feeder. One of the results of achieving this objective is the ability to feed parts at a more rapid rate since the orientation at the secondary and tertiary and further stages may be done in a straight line, and directly in a position for reorientation if discharged.

Another object of the present invention is to provide a feeder and method for parts which is inherently inexpensive to construct, and is widely adaptable to a whole host of feeding problems. Necessarily, by achieving this objective, the machine cost can be reduced for a given feeding problem over the techniques employed heretofore without sacrifice in speed, or precision.

Still another object of the present invention is to provide a feeder for which many parts can be standardized, and prefabricated, to the end that ultimate tooling for a wide variety of parts, particularly those which are cup-shaped, can be held to a minimum. Naturally the reduction in the experimental aspect of tooling the feeder is accompanied by a cost reduction and reduced service problems.

DESCRIPTION OF ILLUSTRATIVE DRAWINGS

Further objects and advantages as well as a better understanding of the invention of the feeder and method will be appreciated as the following description proceeds, taken in conjunction with the accompanying illustrative drawings in which:

FIG. 1 is a front elevation of a rotary cone type feed illustrative of the apparatus of the present invention.

FIG. 2 is a plan or top view of the rotary cone feeder of FIG. 1 in substantially the same scale as FIG. 1.

FIG. 3 is an enlarged plan view, partially broken and partially sectioned, taken along section line 3—3 of FIG. 1.

FIG. 4 is an enlarged transverse broken sectional view of the rotary cone and delivery chute portion taken along section line 4—4 of FIG. 1.

FIG. 5 is an enlarged partially diagrammatic view of the delivery track taken along section line 5—5 of FIG. 2.

FIG. 6 is a sequential view to FIG. 5 on the delivery track taken along section line 6—6 of FIG. 2.

FIG. 7 is a sequential view subsequent to FIG. 6, and taken along section line 7—7 of the second orienting section.

FIG. 8 is a view sequential to FIG. 7 taken along section 8—8 of FIG. 2 and showing how a cup-shaped member will trip off of the second orienting member and drop into the bowl for recirculation.

FIG. 9 is a view taken along section line 9—9 of FIG. 2 indicating the recapture of the oriented part.

FIG. 10 is a subsequent view taken along section section 10—10 of FIG. 2 showing the parts recaptured and in the discharge track.

DESCRIPTION OF ILLUSTRATIVE EMBODIMENT

The invention is illustrated in an embodiment which employs a rotary cone type centrifugal feeder 10. It will be appreciated, however, that vibratory type feeders such as shown in U.S. Pat. No. 3,500,993 may also be employed. The part being fed is a cup 1. In this instance it will be appreciated that while reference is made primarily to a "cup" the orientation at the secondary stage can be of other shaped products. More specifically, the cup shown is one in which the ratio of the diameter to the depths of the skirt is significantly in excess of 1 to 1. Thus the part receives its primary orientation within the feeder 10, and its secondary orientation takes place as the part passes over a second orienting section 20 which is above and over the bowl of the feeder 10 and therefore may be recirculated for further processing.

More specifically, as shown in FIG. 1, the feeder 10 has a side wall 12 which surrounds a rotary cone 11 (see FIG. 2), and a first orientor 13 at the periphery of the rotary cone 11 and thereabove (see FIG. 4).

The rotary cone 11 is driven by means of a motor drive 15, secured to the underside of the feeder 10. The entire rotary cone 11 and wall 12 are positioned atop a feeder base 14, and are adjustable along the central axis for purposes of tilt.

As shown particularly in FIG. 4, the first orientor 13 includes a funnel portion 21 which is angled and secured at its upper end portion to the side wall 12. Beneath the funnel portion 21, is a roof portion 22 which permits the cups 1 to be trapped beneath the roof portion 22 and against the side wall 12 of the feeder.

As shown in more detail in FIG. 3, the cup 1 after passing beneath the roof portion 22 of the first orientor 13 meets the diverting roller 25 which is on an extension of the delivery track wall 24. This extension is substantially a cantilever in nature, and permits the cup 1 to be guided against the outer wall 35 of the delivery track 16 to pass outside the feeder 10. Particularly as shown in FIG. 1, 2, and 3, a brush assist or other positive feed assist may be employed to elevate the cups 1 in the upward reverse turn portion of the delivery track 16 until they are positioned to drop down onto the second orienting section 20. The drive assist 30 includes a motor 31 (see FIG. 1) and a brush driven thereatop. A brush slot 34 is provided in the outer wall 35 of the delivery track so that a portion of a segment of the brush 32 penetrates into the delivery track 16 (see particularly FIG. 3). A track mount 29 is employed to secure the outer wall 35 of the delivery track 16 to the side wall 12 of the feeder 10. The inner wall 24 of the delivery track 16 is secured by means of a bracket 28 to the outer wall 12 of the feeder.

Thus in operation, the first orientation takes place when the cup 1 finds itself at the periphery of the rotating rotor 11, and then in the cup trap 26 defined beneath the foof portion 22 of the first orientor 13, ready for delivery to the delivery track 16 as illustrated in sepcific detail in FIG. 4.

The dischage track 18 is fed by the second orienting section 20. For a better understanding of the configuration of the illustrated secondary orienting section 20, reference will be made sequentially to FIGS. 5 through 10. Noted in FIG. 5, of course, is the delivery track 16, in which the cup 1 may be upside down or right side up, resting atop the base 36 of the delivery track. The cup then moves along the base 36 confined by the outer wall 35 and the inner wall 24. The same moves upwardly and takes approximately a 180° reverse in direction, and at the same time is tilted as shown in FIG. 6. At the position shown in FIG. 6, the cup 1 has reversed its direction of travel 180° and then elevated, and is tilted to one side. Thereafter the cup 1 begins to pass over the rotary cone 21 and inside the confine of the wall 12 of the feeder 10. At this point, the second orienting section 20 is encountered and the part rests against the tilt base 39 of the second orienting section 20, secured by means of a trip ledge 40. In this instance, the improperly oriented part falls back into the bowl of the feeder 10 because its center of gravity in the improperly oriented direction will cause the same to trip off of the trip ledge 40 as illustrated in FIG. 8. After the rejected parts are off the second orienting section 20, the same reverses back to an orientation such as being fed by the delivery track 16 and is illustrated in FIG. 9 in which the tilt base returns to a more horizontal position, and the cup 1 is recaptured by means of a stabilizing ledge 41, opposed to the trip ledge 40. Thereafter the part enters the discharge track 18, as illustrated in FIG. 7. The discharge track 18 includes a pair of opposed locking flanges 42 which confine the part or cup 1 within the discharge track 18 for transfer to further processing.

As pointed above, while a rotary cone type feeder 10 has been shown, the structure is readily adaptable to vibratory and other type feeders, and the same are contemplated as being usefully tooled in accordance with the present invention.

THE METHOD

The method of feeding and orienting contemplates substantially the following steps:

A. delivering parts in random partially oriented fashion to confining means,

B. elevating the parts in the confining means and reversely moving the same until they are over the recirculatory portion of the host feeder, C. performing secondary orienting steps on the part in a path over the top of the feeder, and, D. recapturing the part in discharge means after the same has past over the major portion of the recirculatory portion of the host feeder.

Necessarily the method is independent of the particular feeder shown, and may actually rely on the use of circulatory feeders, circular vibratory feeders, and square type vibratory feeders.

Although particular embodiments of the invention have been shown and described in full here, there is no intention to thereby limit the invention to the details of such embodiments. On the contrary, the intention is to cover all modifications, alternatives, embodiments, usages and equivalents of a feeder and method of feeding as fall within the spirit and scope of the invention, specification and the appended claim.

What is claimed is:

1. A feeder for small parts which oreints the same comprising, in combination, a feeder first orienting means interior of the feeder prior to the delivery of parts, a delivery track in feeding communication secured to the feeder to receive parts from the first orienting means, said delivery track being oriented upwardly and outwardly and reversedly to pass back over the feeder at a position elevated thereof, second orienting means in direct feed communication with the delivery track over the feeder, said second orienting means including reject means to discharge unoriented parts back into the feeder, said reject means including a tilted base having a ledge in combination therewith whereby parts whose center of gravity passes over the vertical axis of the extreme portion of the ledge will be recirculated into the feeder, and a discharge track in feed communication with the second orienting means to transport the part properly oriented for further processing.

2. In the feeder of claim 1, part accelerating means positioned within the delivery track closely adjacent the connection between the delivery track and first orienting means to provide positive pressure on the parts to elevate and reverse the same throughout the travel to the delivery track.

3. In the feeder of claim 1,
a funnel and roof combination comprising the first orientor and defining therebeneath a trap for cup-shaped parts,
said cup-shaped parts having a ratio greater than 1 to 1 of the diameter to the skirt depth, and said trap having a width greater than its height.

4. In the feeder of claim 1,
an extension of the delivery track penetrating interiorly of the feeder,
and roller diverter means on the extreme end of said extension to thereby divert parts into the delivery track or reject the same back into the feeder for recirculation.

5. In the feeder of claim 2,
a funnel and roof combination comprising the first orientor and defining therebeneath a trap for cup-shaped parts,
said cup-shaped parts having a ratio greater than 1 to 1 of the diameter to the skirt depth, and said trap having a width greater than its height.

6. In the feeder of claim 2,
an extension of the delivery track penetrating interiorly of the feeder,
and roller diverter means on the extreme end of said extension to thereby divert parts into the delivery track or reject the same back into the feeder for-recirculation.

7. In the feeder of claim 1,
a funnel and roof combination comprising the first orientor and defining therebeneath a trap for cup-shaped parts,
said cup-shaped parts having a ratio greater than 1 to 1 of the diameter to the skirt depth, and said trap having a width greater than its height.

8. In the feeder of claim 1,
an extension of the delivery track penetrating interiorly of the feeder,
and roller diverter means on the extreme end of said extension to thereby divert parts into the delivery track or reject the same back into the feeder for recirculation.

9. A method of feeding parts comprising the steps of:
delivering parts in random partially oriented fashion to confining means,
elevating the parts in the confining means and reversely moving the same until they are over a recirculatory portion of the host feeder,
performing secondary orienting steps on the part in a path over the top of the feeder, and
recapturing the part in discharge means after the same has past over the major portion of the recirculatory portion of the host feeder,
whereby parts are given a primary orientation in the feeder, and a secondary orientation while the same are past over the feeder to the end that rejected parts are automatically recirculated by dropping into the interior portion of the feeder.

* * * * *